(12) United States Patent
Sato et al.

(10) Patent No.: US 10,687,102 B2
(45) Date of Patent: Jun. 16, 2020

(54) INFORMATION PROCESSING DEVICE, INFORMATION PROCESSING METHOD, AND CONTROL DEVICE

(71) Applicant: Sony Corporation, Tokyo (JP)

(72) Inventors: Masahiko Sato, Tokyo (JP); Hideo Nagasaka, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/580,025

(22) PCT Filed: May 16, 2016

(86) PCT No.: PCT/JP2016/064413
§ 371 (c)(1),
(2) Date: Dec. 6, 2017

(87) PCT Pub. No.: WO2017/022297
PCT Pub. Date: Feb. 9, 2017

(65) Prior Publication Data
US 2018/0167657 A1 Jun. 14, 2018

(30) Foreign Application Priority Data
Aug. 5, 2015 (JP) ................................ 2015-154828

(51) Int. Cl.
*H04N 21/258* (2011.01)
*G06F 13/00* (2006.01)
(Continued)

(52) U.S. Cl.
CPC ........... *H04N 21/258* (2013.01); *G06F 13/00* (2013.01); *G06F 16/955* (2019.01);
(Continued)

(58) Field of Classification Search
CPC .......... H04N 21/258; H04N 21/26283; H04N 21/4622; H04N 21/235; G06F 13/00
See application file for complete search history.

(56) References Cited

U.S. PATENT DOCUMENTS

| | | | |
|---|---|---|---|
| 6,557,171 B1* | 4/2003 | Sonoda | H04H 20/93 348/E5.108 |
| 2005/0166228 A1* | 7/2005 | Takatori | H04N 5/44543 725/39 |

(Continued)

FOREIGN PATENT DOCUMENTS

| | | |
|---|---|---|
| JP | 2002215924 A | 8/2002 |
| JP | 2004-289776 A | 10/2004 |

(Continued)

OTHER PUBLICATIONS

Toshio Nakagawa; A Design of TV Program Indentifier for Internet Service; FIT2013 Dai 12 Kai Forum on Information Technology Koen Ronbunshu, Separate vol. 4, Aug. 20, 2013, pp. 641-642 (4 pgs.).

(Continued)

*Primary Examiner* — Nasser M Goodarzi
*Assistant Examiner* — Adil Ocak
(74) *Attorney, Agent, or Firm* — Lerner, David, Littenberg, Krumholz & Mentlik, LLP

(57) ABSTRACT

To transmit link information regarding a content in accordance with the current time to a terminal device of a user in which information that identifies a predetermined event has been registered in advance, an information processing device includes: an extraction unit configured to extract, from a link schedule table in which link information regarding a plurality of contents has been associated with individual identification information that identifies a predetermined event together with a time axis, the link information regarding a content in accordance with a current time; and (Continued)

Link Schedule Table

| original_ID: XYZ | | |
|---|---|---|
| Event Name: Drama AAA | | |
| start: date/time | end: date/time | Link Target |
| Apr. 28/102:00 | May. 07/20:00 | www.webpage |
| Apr. 29/00:00 | May. 07/21:00 | event_ID xyz |
| May. 07/20:00 | May. 07/21:00 | tanbun.co/xyz |
| May. 07/21:00 | May. 14/23:59 | www.vod | a transmission control unit configured to transmit the link information regarding the content having been extracted to a terminal device in which the individual identification information has been registered.

18 Claims, 10 Drawing Sheets

(51) Int. Cl.
*G06F 16/955* (2019.01)
*H04N 21/262* (2011.01)
*H04N 21/81* (2011.01)
*H04N 21/858* (2011.01)
*H04N 21/4722* (2011.01)
*G06F 16/9537* (2019.01)
*H04N 21/235* (2011.01)
*H04N 21/462* (2011.01)

(52) U.S. Cl.
CPC ....... *G06F 16/9537* (2019.01); *H04N 21/235* (2013.01); *H04N 21/262* (2013.01); *H04N 21/26283* (2013.01); *H04N 21/4722* (2013.01); *H04N 21/8133* (2013.01); *H04N 21/8586* (2013.01); *H04N 21/4622* (2013.01)

(56) References Cited

U.S. PATENT DOCUMENTS

2006/0259938 A1 11/2006 Kinoshita et al.
2013/0014194 A1 1/2013 Fukui
2015/0052570 A1* 2/2015 Lee .................... H04N 21/2187
725/110

FOREIGN PATENT DOCUMENTS

| JP | 2006166284 A | 6/2006 |
| JP | 4841492 B2 | 12/2011 |
| WO | 2012102038 A1 | 8/2012 |

OTHER PUBLICATIONS

International Search Report from PCT/JP2016/064413, dated Aug. 16, 2016 (3 pgs.).

* cited by examiner

FIG. 3

ID_code Table

| ID_code data | original_ID |
|---|---|
| 80 55 61 88 a6 53 a8 a8 | XYZ |
| 26 db 10 d3 c5 c3 29 ce | ABC |
| cf 84 39 d0 d8 10 d2 d7 | STM |

FIG. 4

Link Schedule Table

| original_ID: XYZ | | |
|---|---|---|
| Event Name: Drama AAA | | |
| start: date/time | end: date/time | Link Target |
| Apr. 28/102:00 | May. 07/20:00 | www.webpage |
| Apr. 29/00:00 | May. 07/21:00 | event_ID xyz |
| May. 07/20:00 | May. 07/21:00 | tanbun.co/xyz |
| May. 07/21:00 | May. 14/23:59 | www.vod |

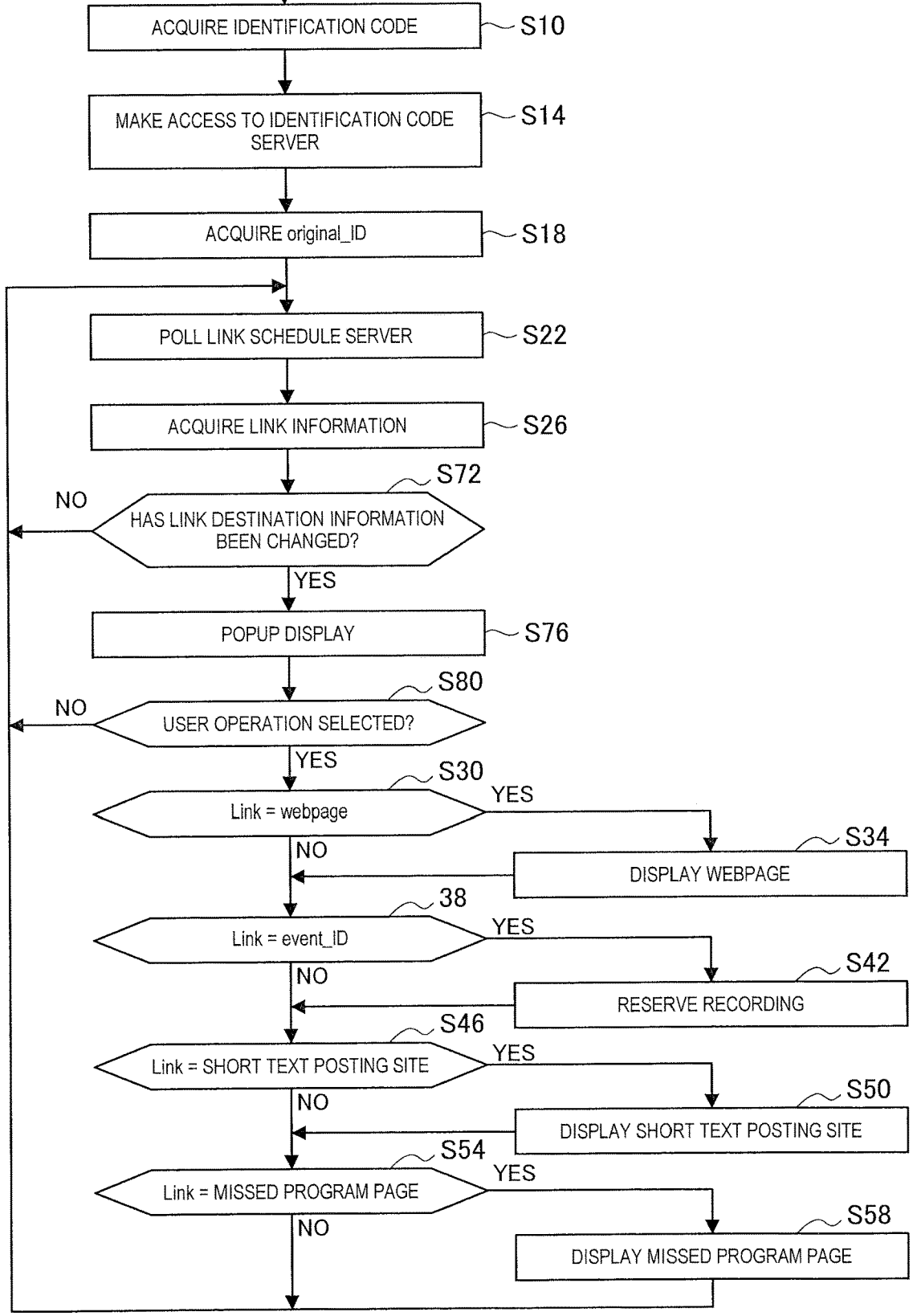

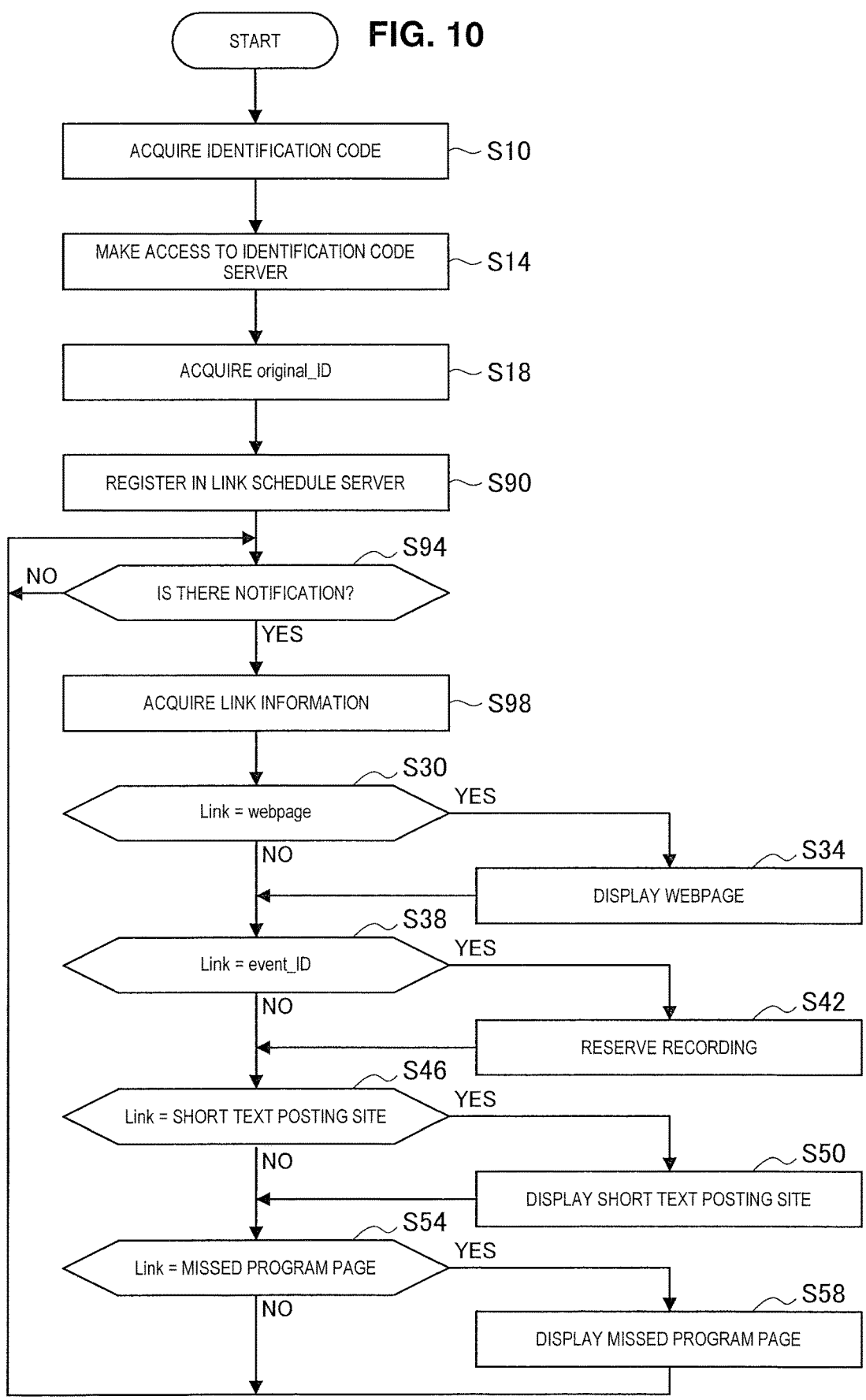

INFORMATION PROCESSING DEVICE, INFORMATION PROCESSING METHOD, AND CONTROL DEVICE

CROSS-REFERENCE TO RELATED APPLICATIONS

This application is a national phase entry under 35 U.S.C. § 371 of International Application No. PCT/JP2016/064413 filed May 16, 2016, which claims the priority from Japanese Patent Application No. 2015-154828, filed in the Japanese Patent Office on Aug. 5, 2015, the entire contents of which are hereby incorporated by reference.

TECHNICAL FIELD

The present disclosure relates to an information processing device, an information processing method, and a control device.

BACKGROUND ART

Conventionally, there is an information processing device that converts identification information that identifies a certain content into identification information regarding corresponding another content and provides the identification information to a user. For example, Patent Literature 1 discloses an information processing device including conversion means for converting identification information regarding a certain content into identification information regarding corresponding another content on the basis of table information indicating correspondences among pieces of identification information that identifies contents and search means for searching for the other content indicated by the identification information after conversion.

In addition, Patent Literature 2 discloses an information processing device in which, as to a link to a content to be distributed to a terminal device at a distribution time determined in advance, a behavior of the terminal device when referring to the link is changed depending on whether the time at which the link is referred to is before content distribution, during distribution, or after content distribution. In addition, this information processing device enables access to a content to be made at any time, and prevents the link from becoming invalid.

CITATION LIST

Patent Literature

Patent Literature 1: JP 4841492B
Patent Literature 2: JP 2006-166284A

DISCLOSURE OF INVENTION

Technical Problem

In a case where a certain event is performed, if a person having interest in the event can access various types of information related to the event, the degree of interest in the event is further increased, and the degree of satisfaction also increases. Information useful for a user having interest in the event is different among a period until the event is started, a time slot in which the event is being performed, and a period after the event is finished. For a user showing interest in a predetermined event in advance, if it is possible to provide a terminal device of the user with information regarding various contents in accordance with a time when the event is to be performed and the current time, it is considered that the degree of satisfaction of the user can be increased.

However, the information processing device described in the Patent Literature 1 converts identification information on the basis of table information indicating a fixed relation, such as one-segment broadcasting and full-segment broadcasting, for example, to change a link reference destination, and the identification information after conversion does not change along a time axis. In addition, the information processing device described in the Patent Literature 2 relates to a link display when a user makes access to a browser including a link, or the like for browsing, and the user does not have an opportunity to access information regarding a content of a link destination unless the user makes access to the browser including a link or the like.

Therefore, the present disclosure proposes an information processing device and an information processing method or a control device being novel and improved that can transmit link information regarding a content in accordance with the current time to a terminal device of a user in which information that identifies a predetermined event has been registered in advance.

Solution to Problem

According to the present disclosure, there is provided an information processing device including: an extraction unit configured to extract, from a link schedule table in which link information regarding a plurality of contents has been associated with individual identification information that identifies a predetermined event together with a time axis, the link information regarding a content in accordance with a current time; and a transmission control unit configured to transmit the link information regarding the content having been extracted to a terminal device in which the individual identification information has been registered.

In addition, according to the present disclosure, there is provided an information processing method including: extracting, from a link schedule table in which link information regarding a plurality of contents has been associated with individual identification information that identifies a predetermined event together with a time axis, the link information regarding a content in accordance with a current time; and transmitting the link information regarding the content having been extracted to a terminal device in which the individual identification information has been registered.

In addition, according to the present disclosure, there is provided a control device including: a registration processing unit configured to perform processing of registering individual identification information that identifies a predetermined event; an acquisition unit configured to acquire link information regarding a content extracted in accordance with a current time from a link schedule table in which link information regarding a plurality of contents has been associated with the individual identification information together with a time axis and transmitted by an information processing device; and a control unit configured to perform predetermined operation control on a basis of the link information having been acquired.

Advantageous Effects of Invention

As described above, according to the present disclosure, it is possible to transmit, in accordance with the current time, link information regarding a content related to a predetermined event to a terminal device in which individual identification information has been registered in advance. Consequently, a user who utilizes the terminal device can obtain the link information regarding the content related to the event to gain various experiences, and can obtain a high degree of satisfaction.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is an explanatory drawing showing an example of an identification code table.

FIG. 4 is an explanatory drawing showing an example of a link schedule table.

FIG. 9 is a flowchart showing a first variation of the control process in the terminal device.

FIG. 10 is a flowchart showing a second variation of the control process in the terminal device.

MODE(S) FOR CARRYING OUT THE INVENTION

Figure 1:
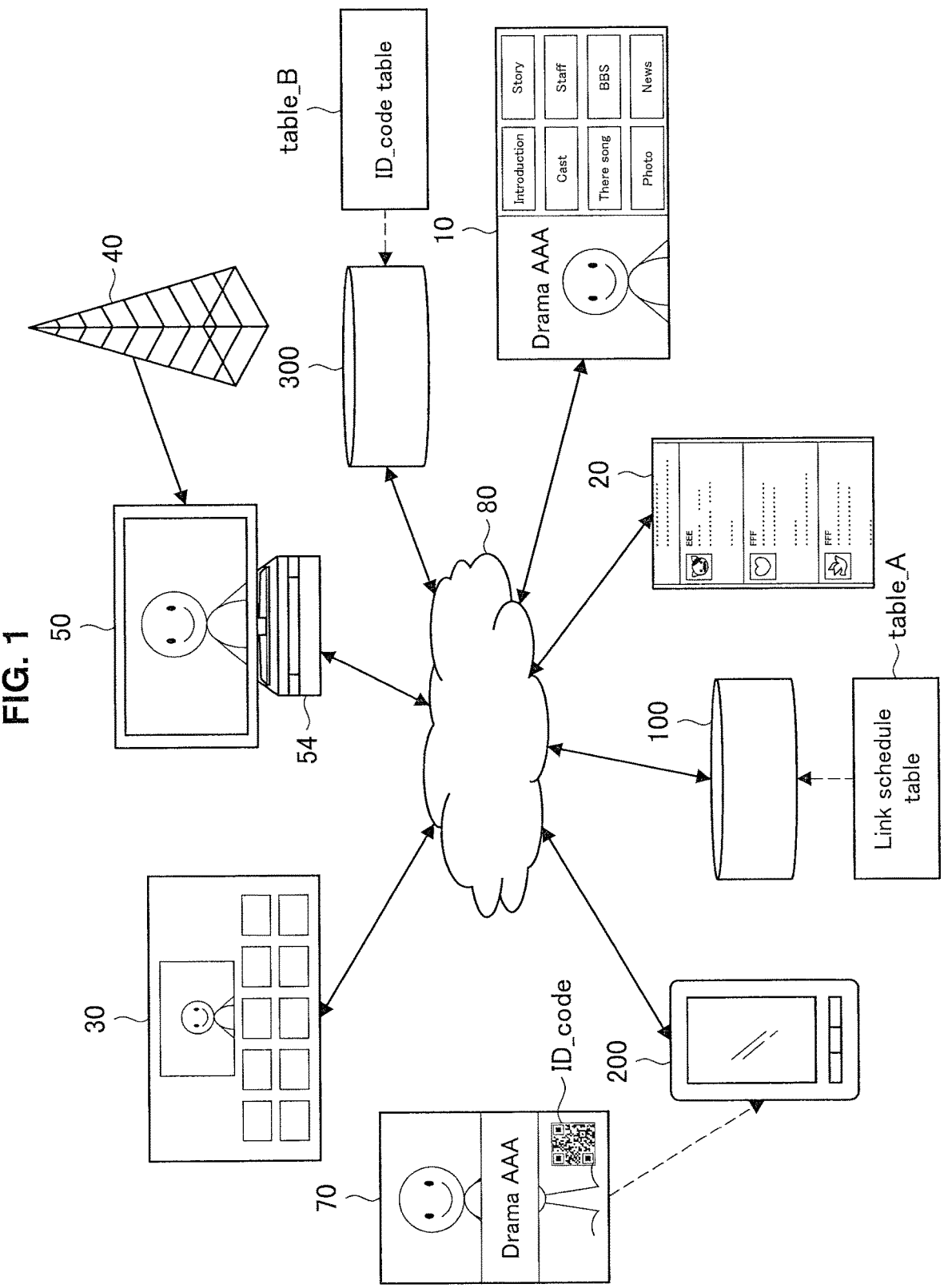
FIG. 1 is a conceptual diagram for describing an example of an information processing system using an information processing device according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Overall configuration of information processing system
2. Functional configuration of information processing system
2-1. Terminal device
2-2. Identification code server
2-3. Link schedule server
3. Flowcharts
3-1. Control process in terminal device
3-2. Control process in identification code server
3-3. Control process in link schedule server
4. Variations
4-1. First variation
4-2. Second variation
5. Conclusion
6. Application examples

1. INFORMATION PROCESSING SYSTEM (1-1. Overview)

First, an example of an information processing system according to the present embodiment will be described. The information processing system according to the present embodiment is an example of a system that, prior to broadcasting, during broadcasting, and after broadcasting of a certain television program, provides link information regarding a related content for a user having interest in the television program. For example, when a new television program is started, advertising activities are performed beforehand for the purpose of disseminating the television program to many people.

It is considered that, by providing people who have become interested in the television program through such advertising activities with various related contents, those people are more interested in the television program and have more fun. It is also considered that a provider of the television program can not only spread the advertising activities for the television program by providing various related contents for people showing interest, but also increase business opportunities even after broadcasting is finished.

(1-2. Overall Configuration of System)

FIG. 1 is a conceptual diagram for describing an example of an information processing system according to the present embodiment. Such an information processing system includes a link schedule server 100, a terminal device 200, an identification code server 300, and a television receiver 50. These respective components are capable of transmitting/receiving information to/from one another via a communication network 80, such as the Internet. The link schedule server 100 according to the present embodiment is equivalent to the information processing device according to the present disclosure.

In such an information processing system, in a case where a new program of television broadcasting is started, for example, the link schedule server 100 transmits link information regarding various related contents in a timely fashion to the terminal device 200 in which identification information regarding the new program has been registered. The terminal device 200 having received the link information operates the terminal device 200 in accordance with the type of the link information. Accordingly, a user who uses the terminal device 200 can utilize a content related to the new program, and can gain various experiences related to the television program.

The terminal device 200 is a device capable of making access to the communication network 80 and capable of displaying a web content, and can be a device such as, for example, a smartphone, a personal computer, a mobile phone, a tablet computer, or a personal digital assistant (PDA) terminal. In the present embodiment, the terminal device 200 is a camera-mounted smartphone, and can image an identification code ID_code, such as a one-dimensional code or a two-dimensional code which is information printed on a street advertisement 70 or the like for a predetermined television program for identifying the predetermined television program. The identification code ID_code may be a bar code, a matrix type two-dimensional code, a stacked type two-dimensional code, or the like, for example.

Such a terminal device 200 can perform various processing operations upon receipt of operation inputs made by a user. The terminal device 200 can also perform various processing operations on the basis of link information Link target transmitted from the link schedule server 100. In FIG. 1, a program introduction site 10, a short text posting site 20, and a missed program providing site 30 are illustrated as web contents that the terminal device 200 can display or make access to.

The television receiver 50 receives a television signal from a television broadcasting network 40, and displays video on the basis of the received television signal. A recording apparatus 54 that records television broadcasting is connected to the television receiver 50. The television receiver 50 and the recording apparatus 54 include a communication unit not shown for connection to the communication network 80. The television receiver 50 and the recording apparatus 54 may be separate devices, or may be integral.

The identification code server 300 stores an identification code table table_B in which a correspondence between information indicating the identification code ID_code, such as a two-dimensional code, and individual identification information original_ID assigned to each television program which is identification information different from the identification code ID_code has been recorded. The identification code ID_code is obtained by coding various types of information related to a television program, while the individual identification information original_ID is identification information for enabling information processing by the link schedule server 100 according to the present embodiment to be utilized. The individual identification information original_ID may be identification information including a combination of numbers, characters, symbols, and the like, for example. The identification code server 300 refers to the identification code table table_B to convert information indicating the identification code ID_code transmitted from the terminal device 200 into corresponding individual identification information original_ID for transmission to the terminal device 200.

The link schedule server 100 stores a link schedule table table_A in which link information Link target regarding a plurality of contents has been associated with the individual identification information original_ID together with a time axis. The link schedule server 100 extracts link information Link target regarding a content in accordance with the current time from the link schedule table table_A, and transmits the extracted link information Link target to the terminal device 200 in which the individual identification information original_ID has been registered. The link schedule table table_A may be table information in which link information Link target regarding various contents has been associated with the individual identification information original_ID regarding an individual television program together with a date of starting validation and a date of terminating validation in a period prior to broadcasting of a television program, during broadcasting, and in a period after broadcasting.

The plurality of contents may include web contents and television broadcasting contents, for example. The plurality of contents may additionally include various types of information including music contents, electronic program guide (EPG) data, a social network service (SNS), schedule data, and the like.

The terminal device 200 controls an operation of the terminal device 200 on the basis of the link information Link target transmitted from the link schedule server 100. For example, in a case where the link information Link target is a URL of a web site, the terminal device 200 may display the web site or a screen that prompts to browse the web site. In addition, in a case where the link information Link target is event identification information event_ID regarding television broadcasting, the terminal device 200 may cause the television receiver 50 to display the television program, or may cause the recording apparatus 54 to perform recording reservation.

(1-3. Usage Example)

The information processing system according to the present embodiment allows a user to gain experiences as described below, for example. When a user of the terminal device 200 images the identification code ID_code printed on the street advertisement 70 or the like, the terminal device 200 analyzes the identification code ID_code, and stores information indicating the identification code ID_code. The user transmits the information indicating the identification code ID_code to the identification code server 300 by means of application software. The identification code server 300 having received the information indicating the identification code ID_code refers to the identification code table table_B to convert the information indicating the identification code ID_code into corresponding individual identification information original_ID for transmission to the terminal device 200.

Upon receipt of the individual identification information original_ID, the terminal device 200 makes access to the link schedule server 100 in a timely fashion to request for link information Link target corresponding to the individual identification information original_ID. Upon receipt of the request from the terminal device 200, the link schedule server 100 refers to the link schedule table table_A to extract link information Link target regarding a content corresponding to the individual identification information original_ID in accordance with the current time. In addition, the link schedule server 100 transmits the extracted link information Link target regarding the content to the terminal device 200.

The terminal device 200 performs a predetermined processing operation on the basis of the received link information Link target to display a linked web site or display an image that prompts to browse the web site, or the like. In this manner, the user of the terminal device 200 can be guided to various contents related to a new program and gain various experiences.

2. FUNCTIONAL CONFIGURATION OF INFORMATION PROCESSING SYSTEM

Figure 2:
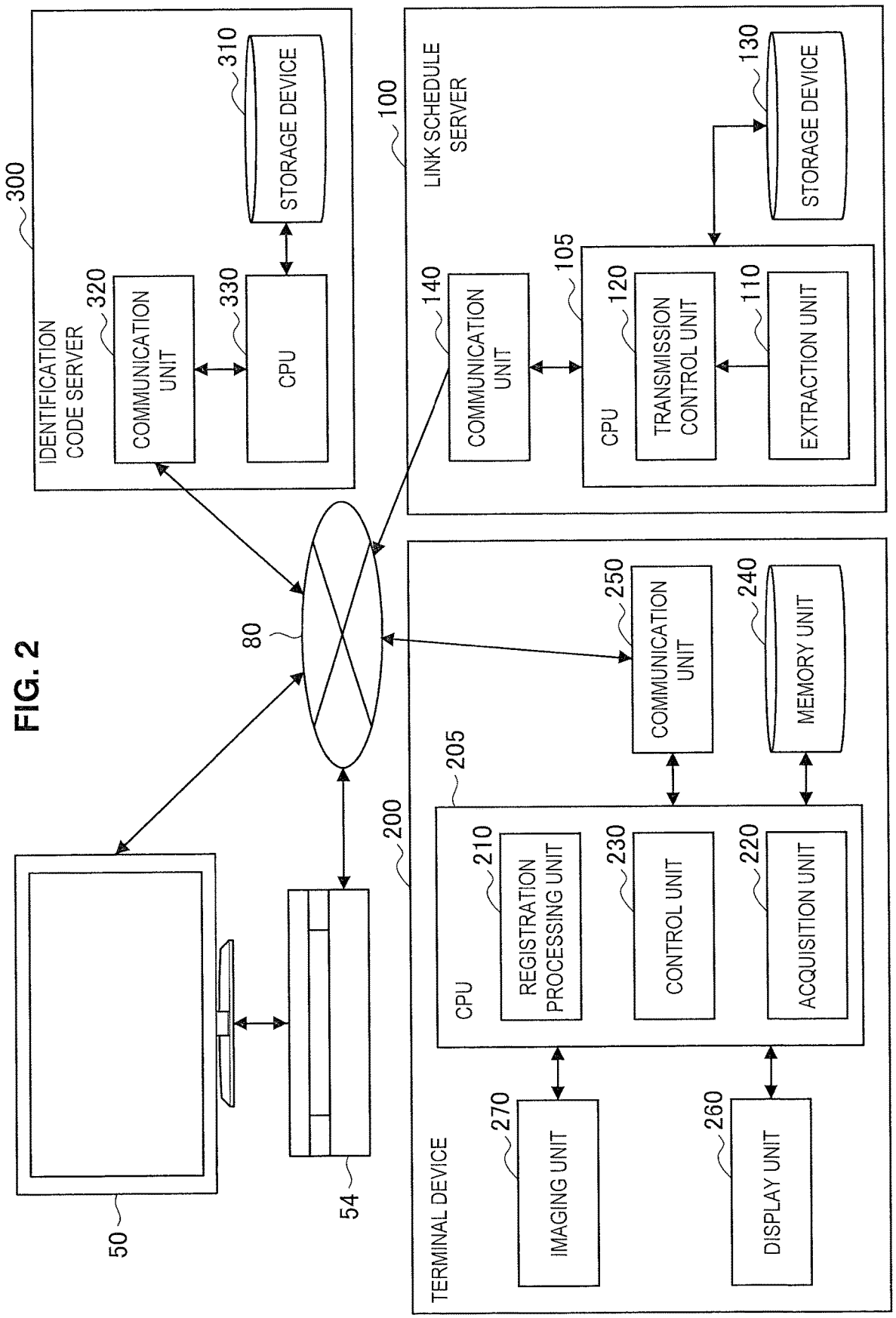
FIG. 2 is a block diagram showing a functional configuration of the information processing system according to the embodiment.

Next, an example of a functional configuration of the information processing system will be described. FIG. 2 is a block diagram showing a functional configuration of the information processing system according to the present embodiment.

(2-1. Television Receiver)

The television receiver 50 receives a television signal and program information from the television broadcasting network 40, and displays various types of information regarding a television program corresponding to the television signal or the like on a display screen. The television receiver 50 includes a communication unit not shown for communicating with a television broadcasting network or communicating with an external device, such as the link schedule server 100, the terminal device 200, or the identification code server 300, via the communication network 80.

The recording apparatus 54 is connected to the television receiver 50. The recording apparatus 54 receives a television signal and program information, and stores television program data and program information in a memory unit. In addition, the recording apparatus 54 reads out the television program data and the program information stored in the memory unit, and plays back a recorded program that the television program data indicates. The program information is information for specifying a television program, and may include information such as a program title, a broadcasting time, and a broadcast station name, for example. The recording apparatus 54 may be built in the television receiver 50.

Note that the television receiver 50 is not limited to a device of the above-described configuration, but various devices having the function of displaying a television program can be used. For example, the television receiver 50 may be a mobile phone, a smartphone, or a tablet computer adapted to one-segment broadcasting, or a personal computer with a television tuner, or the like. In addition, these television receivers 50 may be connected locally to any of the link schedule server 100, the terminal device 200, or the identification code server 300.

(2-2. Terminal Device)

The terminal device 200 includes a CPU 205, a memory unit 240, a communication unit 250, a display unit 260, and an imaging unit 270. The CPU 205 includes a registration processing unit 210, an acquisition unit 220, and a control unit 230. The respective units of the CPU 205 may be functions implemented by execution of a program by a microcomputer or the like. The CPU 205 according to the present embodiment is equivalent to the control device in the present disclosure. As described above, in the present embodiment, a smartphone is used as the terminal device 200.

The communication unit 250 is a communication interface including a communication device or the like for connection to the communication network 80. The communication unit 250 communicates with the link schedule server 100, the identification code server 300, the television receiver 50, the recording apparatus 54, or another external device via the communication network 80. In the present embodiment, the terminal device 200 is a smartphone, and communication performed by the communication unit 250 is wireless communication, but may be wired communication.

The display unit 260 performs an image display of video, a still image, text, a symbol, and the like on the basis of an instruction of the control unit 230. In the present embodiment, the terminal device 200 is a smartphone, and the display unit 260 includes a touch input unit. The touch input unit accepts an operation input made by a touch operation by a user, and provides an operation signal to the control unit 230. Note that, in a case where the terminal device 200 is a mobile phone, an input unit different from the display unit 260, such as an operation button, may be provided to accept an operation input made by a user. Alternatively, in a case where the terminal device 200 is a personal computer, an input unit different from the display unit 260, such as a keyboard, may be provided to accept an operation input made by a user.

The imaging unit 270 performs imaging in response to an instruction of the control unit 230 on the basis of an operation input made by a user. For example, the imaging unit 270 can include an imaging optical system, such as an imaging lens and a zoom lens that collect light, and a signal conversion element, such as a charge coupled device (CCD) or a complementary metal oxide semiconductor (CMOS). The imaging unit 270 performs imaging in the form of a still image or video, for example, and stores image information having been imaged in the memory unit 240.

A user images the identification code ID_code printed on the street advertisement 70, such as a sign board or a poster posted on the street, in the train, or the like, in the form of a still image, for example, with the imaging unit 270. The identification code ID_code to be imaged may be a bar code which is a one-dimensional code, or may be a matrix type or stacked type two-dimensional code, for example. The identification code ID_code is obtained by coding in advance information indicating a predetermined television program, and has information indicating a program title, a broadcasting time, a broadcast station, and the like, for example.

The registration processing unit 210 analyzes the identification code ID_code imaged with the imaging unit 270, and causes the memory unit 240 to store information indicating the identification code ID_code. The registration processing unit 210 transmits the information indicating the identification code ID_code to the identification code server 300 via the communication network 80. Moreover, the registration processing unit 210 causes the memory unit 240 to store the individual identification information original_ID transmitted from the identification code server 300. Accordingly, processing of registering the individual identification information original_ID into the terminal device 200 that a user uses is completed. For example, the registration processing unit 210 may start registration processing on the basis of an operation instruction by a user. Alternatively, in a case where a predetermined application program has been launched, the registration processing unit 210 may transmit information indicating the identification code ID_code to the identification code server 300 when the identification code ID_code is imaged.

The acquisition unit 220 acquires the link information Link target corresponding to the individual identification information original_ID transmitted from the link schedule server 100 after the completion of the processing of registering the individual identification information original_ID. Specifically, the acquisition unit 220 queries the link schedule server 100 about the link information Link target corresponding to the individual identification information original_ID via the communication unit 250. For example, the acquisition unit 220 may run a query about the link information Link target at constant time intervals set in advance, or may run a query about the link information Link target when it is informed by the link schedule server 100 that there is update information regarding the link information Link target.

Moreover, in the present embodiment, a time interval for running a query may be varied in accordance with a remaining period up to a broadcasting time of a television program or a lapsed period after broadcasting is finished. For example, the acquisition unit 220 may run a query every 24 hours up to 2 weeks before a broadcasting time, may run a query every 12 hours from 2 weeks to 3 days before the broadcasting time, may run a query every 1 hour from 3 days before to the broadcasting time, and may run a query every 24 hours after broadcasting is finished. The acquisition unit 220 provides the acquired link information Link target for the control unit 230.

The link information Link target to be acquired may be the URL of the program introduction site 10, the URL of a viewing reminder site for reminding about a broadcasting time several days or several hours before the broadcasting time of a television program, the URL of a missed program providing site that provides a missed program on demand, the URL of an Internet shopping site that sells related goods, or the like, for example. Alternatively, the link information Link target may be the event identification information event_ID allocated to a television program.

The control unit 230 controls an operation of the terminal device 200 on the basis of an operation input made by a user. For example, the control unit 230 causes the imaging unit 270 to perform imaging on the basis of an operation input made by a user, and causes the display unit 260 to perform an image display, and further, the control unit 230 performs external communication via the communication network 80.

Moreover, the control unit 230 controls an operation of the terminal device 200 on the basis of the link information Link target acquired by the acquisition unit 220. For example, in a case where the URL of a web site is acquired as the link information Link target, the control unit 230 may cause the display unit 260 to display the web site. Alternatively, in a case where the URL of a web site is acquired as the link information Link target, the control unit 230 may cause the display unit 260 to display an image display that prompts a user to browse the web site.

As the image display that prompts to browse the web site, the individual identification information original_ID or a program title linked to the URL of a predetermined web site may be displayed, or a display such as "there is a browseable web site." or "display a web site" linked to the same URL may be displayed, for example. In this case, when a user selects such a link display, the control unit 230 causes the display unit 260 to display a corresponding web site.

Furthermore, in a case where the event identification information event_ID allocated to a television program is acquired as the link information Link target, the control unit 230 may transmit an instruction for recording reservation to the recording apparatus 54 via the communication network 80. Alternatively, in a case where the event identification information event_ID is acquired as the link information Link target, the control unit 230 may cause the display unit 260 to display an image display that prompts to instruct recording reservation.

As the image display that prompts to instruct recording reservation, a display such as "Are you going to perform recording reservation?" or "program recording reservation" may be displayed in addition to displaying the individual identification information original_ID or a program title, for example. In this case, when a user selects such a link display, the control unit 230 causes the recording apparatus 54 to perform recording reservation via the communication network 80.

The memory unit 240 stores various types of information, such as information indicating the identification code ID_code imaged with the imaging unit 270 and the individual identification information original_ID acquired through registration processing by the registration processing unit 210, as well as control parameters. The memory unit 240 may be a memory element, such as a random access memory (RAM), an SD memory card, a flash memory, or the like, for example.

(2-3. Identification Code Server)

The identification code server 300 includes a CPU 330, a memory element, such as a RAM or a ROM, a storage device 310, and a communication unit 320. The communication unit 320 is a communication interface including a communication device or the like for connection to the communication network 80. The communication unit 320 communicates with an external device, such as the link schedule server 100, the terminal device 200, the television receiver 50, or the recording apparatus 54, or the like via the communication network 80. Communication performed by the communication unit 320 may be wired communication, or may be wireless communication.

The CPU 330 functions as an operation processing device and a control device, and controls all or part of operations in the identification code server 300 in accordance with various programs stored in the RAM, the ROM, the storage device 310, a removable recording medium, or the like. The ROM stores programs, operation parameters, and the like used by the CPU 330, for example. The RAM primarily stores programs, parameters when executing them, and the like used by the CPU 330, for example.

The storage device 310 is a device for data storage, and includes a magnetic memory unit device such as a HDD, a semiconductor memory device, an optical memory device, an optical magnetic memory device, or the like, for example. The storage device 310 stores programs and various types of data used by the CPU 330, various types of data acquired externally, and the like. In the present embodiment, the storage device 310 stores the identification code table table_B. The identification code table table_B is table information in which correspondences for converting the information indicating the identification code ID_code transmitted from the terminal device 200 into the individual identification information original_ID have been compiled.

Upon receipt of the information indicating the identification code ID_code from the terminal device 200, the CPU 330 refers to the identification code table table_B to convert the information indicating the identification code ID_code into corresponding individual identification information original_ID. The CPU 330 transmits the obtained individual identification information original_ID to the terminal device 200 via the communication network 80.

FIG. 3 shows an example of the identification code table table_B for use in the information processing system according to the present embodiment. Such an identification code table table_B includes code information regarding a matrix type two-dimensional code imaged with a camera of the terminal device 200 and transmitted and the individual identification information original_ID corresponding to each piece of code information. The individual identification information original_ID is indicated by a combination of three alphabetical characters, such as "XYZ, "ABC", or "STM", per information indicating the identification code ID_code. Accordingly, the matrix type two-dimensional code is converted into the individual identification information original_ID corresponding to the link schedule server 100. It may be possible to sequentially update such an identification code table table_B each time when a new television program is added, for example.

(2-4. Link Schedule Server)

The link schedule server (information processing device) 100 includes a CPU 105, a memory element, such as a RAM or a ROM, a storage device 130 in which various types of data are stored, and a communication unit 140. The CPU 105 includes an extraction unit 110 and a transmission control unit 120. The respective units of the CPU 105 may be functions implemented by execution of a program by a microcomputer or the like.

The communication unit 140 is a communication interface including a communication device or the like for connection to the communication network 80. The communication unit 140 communicates with an external device, such as the terminal device 200 or the identification code server 300, via the communication network 80. Communication performed by the communication unit 140 may be wired communication, or may be wireless communication.

The CPU 105 functions as an operation processing device and a control device, and controls all or part of operations in the link schedule server 100 in accordance with various programs stored in the RAM, the ROM, the storage device 130, a removable recording medium, or the like. The ROM stores programs, operation parameters, and the like used by the CPU 105, for example. The RAM primarily stores programs, parameters when executing them, and the like used by the CPU 105, for example.

The storage device 130 is a device for data storage, and includes a magnetic memory unit device such as a HDD, a semiconductor memory device, an optical memory device, an optical magnetic memory device, or the like, for example. The storage device 130 stores programs and various types of data used by the CPU 105, various types of data acquired externally, and the like. In the present embodiment, the storage device 130 stores the link schedule table table_A. The link schedule table table_A is table information in which link information Link target regarding a plurality of contents has been associated with the individual identification information original_ID assigned in accordance with an individual event together with a time axis.

FIG. 4 shows an example of the link schedule table table_A. Such a link schedule table table_A is table information set for the individual identification information original_ID "XYZ" assigned to a television program "AAA" to be broadcasted at 20:00-21:00 on May 7th. In such a link schedule table table_A, the individual identification information original_ID "XYZ" is shown at the top, and the event name Event Name "AAA" is shown in the second row. Below the event name Event Name, the link information Link target has been set together with a validation start time start: date/time and a validation end time end: date/time. In such a link schedule table table_A, four pieces of link information Link target to be validated in time slots different from one another have been set.

The first link information Link target "www.webpage" is the URL of a program introduction web site, and is validated in a period from 12:00 on April 28th which is 9 days before the broadcasting day to 20:00 on May 7th which is the broadcasting start time. This program introduction web site may be managed by a broadcast station that broadcasts the television program "AAA", for example, and may provide information such as the cast, story, and theme song of the television program.

The second link information Link target "event_ID xyz" is the event identification information event_ID allocated to a television program, and is validated in a period from 0:00 on April 29th which is 8 days before the broadcasting day to 21:00 on May 7th which is the broadcasting end time. This event identification information event_ID may be issued by a management association for television broadcasting waves, or the like, for example. The recording apparatus 54 connected to the television receiver 50 can perform recording reservation of the television program "AAA" on the basis of the event identification information event_ID.

The third link information Link target "tanbun.co/xyz" is the URL of the short text posting site 20, and is validated in a period of 20:00-21:00 on May 7th in agreement with the broadcasting time. This short text posting site 20 is a site run by an administrator different from the broadcast station, for example, and during broadcasting of the television program "AAA", it is possible to browse posts written by a plurality of viewers, and users themselves can write comments on the television program.

The fourth link information Link target "www.vod" is the URL of a missed program providing site, and is validated in a period from 21:00 on May 7th which is the broadcasting end time to 23:59 on May 14th which is a week later. This missed program providing site is a site that provides broadcasted data of the program on demand after broadcasting is finished for a user having missed the broadcasted program, for example, and is run by the broadcast station or an administrator different from the broadcast station. The user can obtain usage authorization from such a missed program providing site to view the missed program after broadcasting.

According to the link schedule table table_A shown in FIG. 4, four types of link information Link target are transmitted to the terminal device 200 in which the individual identification information original_ID regarding the television program "AAA" to be broadcasted at 20:00-21:00 on May 7th has been registered, in the period from 12:00 on April 29th to 23:59 on May 14th.

However, the link schedule table table_A may be changed at any time. For example, since the link schedule server 100 according to the present embodiment provides various types of link information Link target for a user showing interest in a television program, the URL of a program viewing reminding site newly created may be added several days before the broadcasting day. The URL of the program viewing reminding site may be validated in a period from 12:00 two days before the broadcasting day of the television program to the broadcasting start time, for example.

When a query about the link information Link target related to the individual identification information original_ID is received from the terminal device 200, the extraction unit 110 of the CPU 105 refers to the current time and also refers to the link schedule table table_A to extract link information Link target regarding a content in accordance with the current time. The link information Link target to be extracted is not limited to one piece, but a plurality of pieces of link information Link target may be extracted in accordance with the current time. For example, in the example of the link schedule table table_A shown in FIG. 4, only the URL "www.webpage" of the program introduction site 10 is extracted from the link information Link target in a case where the current time is 18:00 on April 29th. Alternatively, in a case where the current time is 12:00 on May 6th, the URL "www.webpage" of the program introduction site 10 and the event identification information "event_ID xyz" are extracted from the link information Link target. The transmission control unit 120 transmits the extracted link information Link target to the terminal device 200 having requested for a query via the communication network 80.

Figure 5:
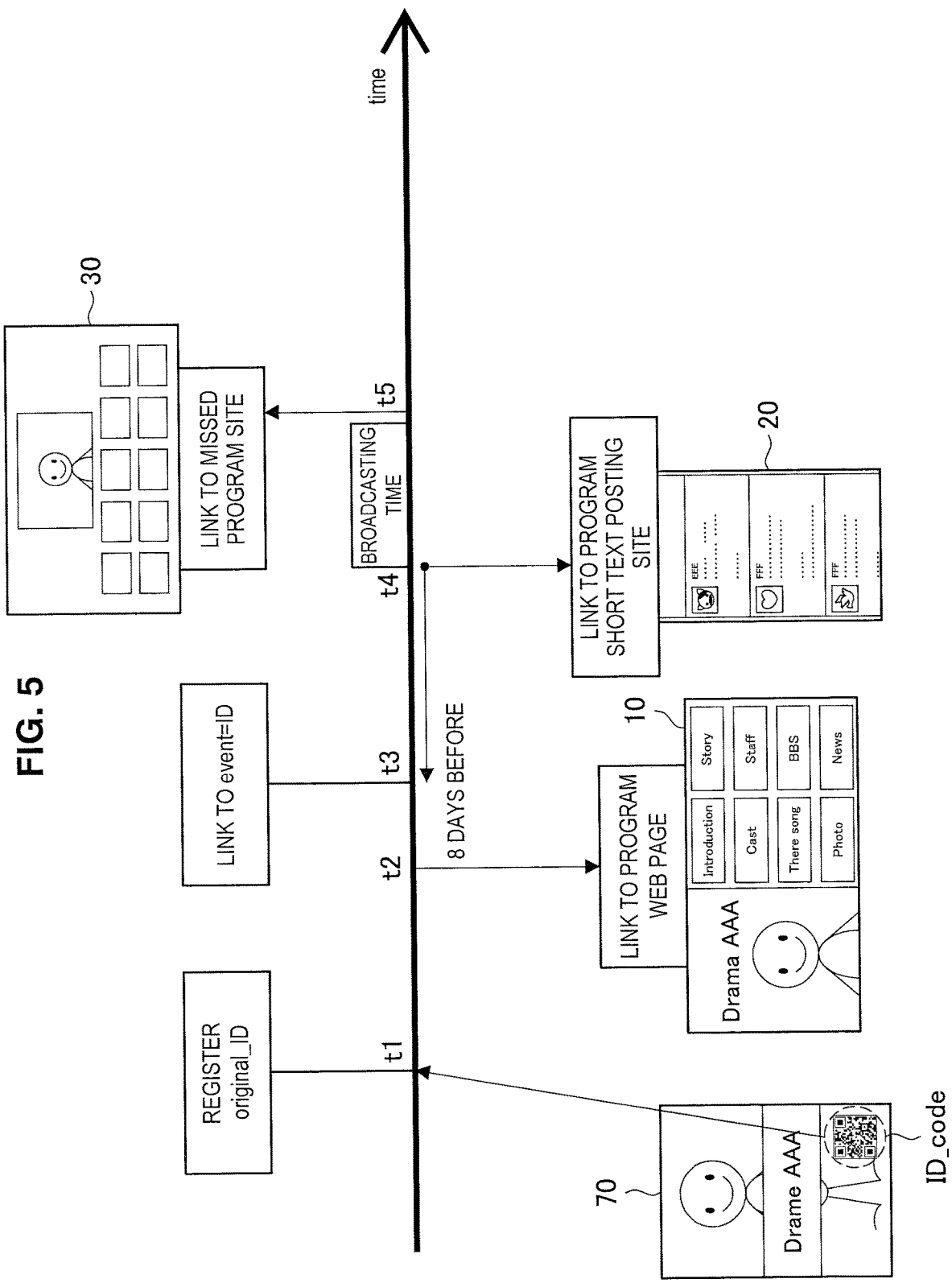
FIG. 5 is an explanatory drawing showing a usage example of the information processing system according to the embodiment.

FIG. 5 is an explanatory drawing showing an example of providing the terminal device 200 in which the individual identification information original_ID regarding the television program "AAA" has been registered with link information Link target regarding a different content in accordance with the link schedule table table_A shown in FIG. 4 by the link schedule server 100. In FIG. 5, a start date t4 of a television program is 20:00 on May 7th, and a finish date t5 is 21:00 on May 7th.

The sign board or promotion advertisement 70 is posted on the street, in the train, or the like from thirty days, for example, before the broadcasting day of the television program "AAA". The identification code ID_code, such as a matrix type two-dimensional code, is printed on the street advertisement 70. On a date t1, a user of the terminal device 200 having acquired interest in the television program performs processing of imaging the identification code ID_code with the imaging unit 270 of the terminal device 200 and also registering the individual identification information original_ID by means of application software. The terminal device 200 in which the individual identification information original_ID has been registered runs a query about the link information Link target to the link schedule server 100 at a time set in advance.

On a date t2 (at 12:00 on April 28th), a link to the URL of the program introduction site 10 is validated in accordance with the link schedule table table_A. After the date t2, in response to the query from the terminal device 200, the URL of the program introduction site 10 is transmitted from the link schedule server 100 to the terminal device 200 as the link information Link target. The terminal device 200 causes the display unit 260 to display the program introduction site 10 on the basis of the acquired link information Link target. Accordingly, the user is guided to the program introduction site 10.

On a date t3 (at 0:00 on April 29th), a link to the event identification information event_ID is validated in accordance with the link schedule table table_A. After the date t3, in response to the query from the terminal device 200, the event identification information event_ID is transmitted from the link schedule server 100 to the terminal device 200 as the link information Link target. The terminal device 200 causes the recording apparatus 54 to perform recording reservation via the communication network 80 on the basis of the acquired link information Link target.

At a broadcasting start time t4 (20:00 on May 7th), a link to the URL of the short text posting site 20 is validated in accordance with the link schedule table table_A. After the date t4, in response to the query from the terminal device 200, the URL of the short text posting site 20 is transmitted from the link schedule server 100 to the terminal device 200 as the link information Link target. The terminal device 200 causes the display unit 260 to display the short text posting site 20 on the basis of the acquired link information Link target. Accordingly, the user is guided to the short text posting site 20.

At a broadcasting end time t5 (21:00 on May 7th), a link to the URL of the missed program providing site 30 is validated in accordance with the link schedule table table_A. After the date t5, in response to the query from the terminal device 200, the URL of the missed program providing site 30 is transmitted from the link schedule server 100 to the terminal device 200 as the link information Link target. The terminal device 200 causes the display unit 260 to display the missed program providing site 30 on the basis of the acquired link information Link target. Accordingly, the user is guided to the missed program providing site.

Note that, after the link information Link target is transmitted to the terminal device 200 and an operation of displaying a web site or a recording reservation operation is executed once, the same operation may be prevented from being executed. Alternatively, the terminal device 200 may execute the operation of displaying a web site in a case where the URL of each web site is transmitted to the terminal device 200 for the first time, and may make a display that prompts to browse the web site in a case where the number of transmission of the URL of each web site is two or more.

3. FLOWCHARTS

The overall configuration or functional configuration of the information processing system according to the present embodiment has been described so far. Hereinafter, an example of a flowchart of each of control processes executed by the terminal device 200, the identification code server 300, and the link schedule server 100 will be described.
(3-1. Control Process in Terminal Device)

Figure 6:
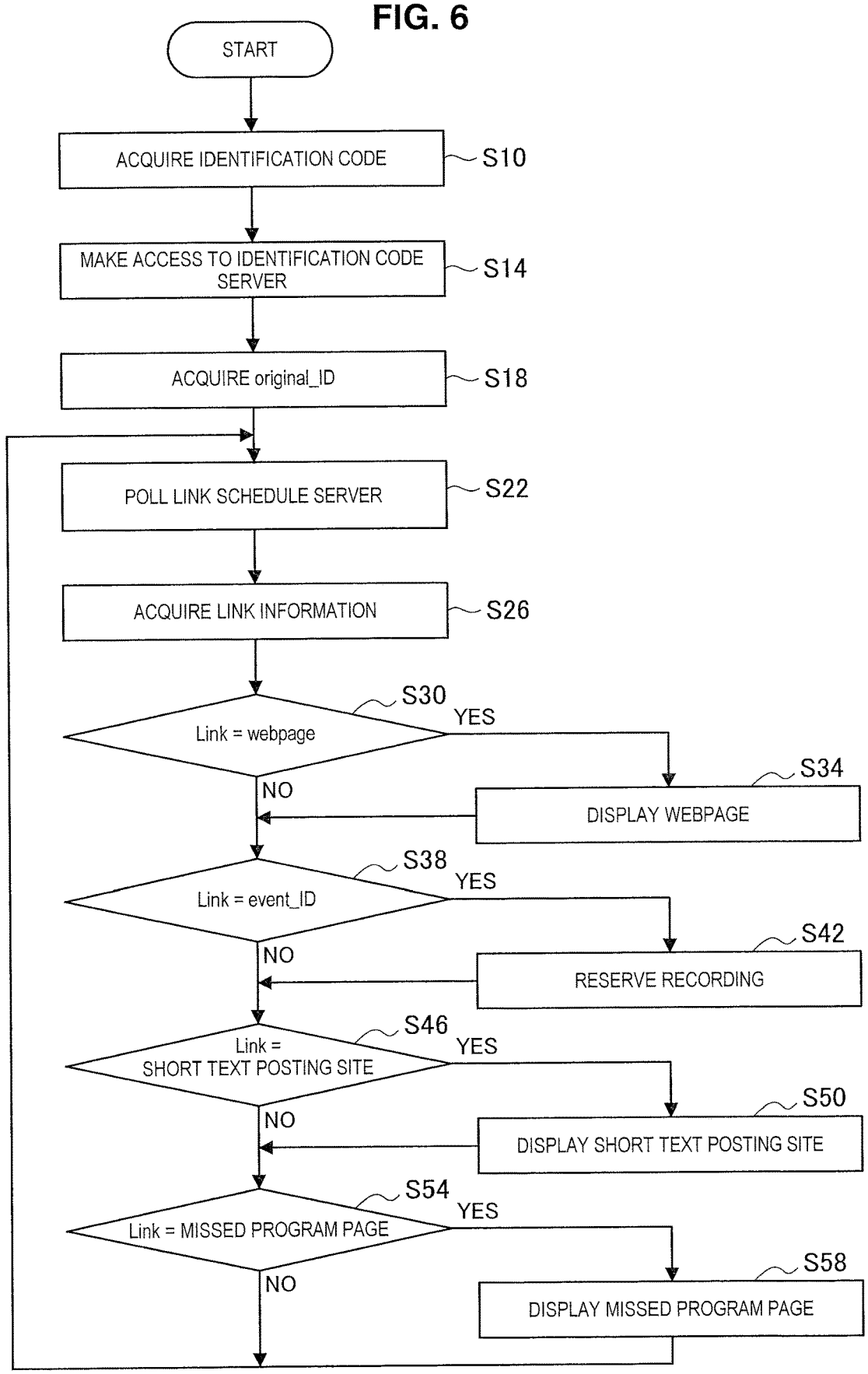
FIG. 6 is a flowchart showing an example of a control process in a terminal device.

FIG. 6 shows a flowchart of the control process executed by the CPU (control device) 205 of the terminal device 200. First, in step S10, the control unit 230 of the CPU 205 causes the imaging unit 270 to image the identification code ID_code, and stores information indicating the imaged identification code ID_code in the memory unit 240. Specifically, the control unit 230 of the CPU 205 causes the imaging unit 270 to image the identification code ID_code, such as a matrix type two-dimensional code, printed on the street advertisement 70 or the like in accordance with an operation input made by a user, and stores information indicating the obtained identification code ID_code in the memory unit 240.

Then, in step S14, the registration processing unit 210 of the CPU 205 makes access to the identification code server 300 via the communication network 80 utilizing application software. The registration processing unit 210 transmits the information indicating the identification code ID_code to the identification code server 300. Accordingly, in the identification code server 300, the information indicating the identification code ID_code is converted into the individual identification information original_ID "XYZ" on the basis of the identification code table table_B, and the individual identification information original_ID "XYZ" is transmitted to the terminal device 200.

Then, in step S18, the registration processing unit 210 acquires the individual identification information original_ID "XYZ" transmitted from the identification code server 300. The acquired individual identification information original_ID "XYZ" is stored in the memory unit 240.

Then, in step S22, the acquisition unit 220 of the CPU 205 performs processing of polling the link schedule server 100 via the communication network 80. Specifically, the acquisition unit 220 requests the link information Link target corresponding to the individual identification information original_ID "XYZ" from the link schedule server 100. Accordingly, in the link schedule server 100, the link information Link target corresponding to the individual identification information original_ID is extracted in accordance with the current time on the basis of the link schedule table table_A, and is transmitted to the terminal device 200.

Then, in step S26, the acquisition unit 220 acquires the link information Link target transmitted from the link schedule server 100. The acquired link information Link target is stored in the memory unit 240.

Then, in step S30, the control unit 230 of the CPU 205 determines whether the acquired link information Link target includes the URL of a program introduction site, a viewing reminder site, or the like. In a case where the URL of a web site is included in the link information Link target (S30: Yes), the control unit 230 advances the process to step S34 to cause the display unit 260 to display the relevant web site. Specifically, the control unit 230 makes access to the linked web site via the communication network 80 to acquire image information, and causes the display unit 260 to display the image information.

In a case where the URL of a web site is not included in the link information Link target (S30: No) or after performing a display of a web site in step S34, the control unit 230 determines in step S38 whether the acquired link information Link target includes the event identification information event_ID. In a case where the event identification information event_ID is included in the link information Link target (S38: Yes), the control unit 230 advances the process to step S42 to cause the recording apparatus 54 of the television receiver 50 to perform recording reservation of the television program "AAA" corresponding to the event identification information event_ID xyz via the communication network 80.

In a case where the event identification information event_ID is not included in the link information Link target (S38: No) or after performing recording reservation in step S42, the control unit 230 determines in step S46 whether the acquired link information Link target includes the URL of a short text posting site. In a case where the URL of a short text posting site is included in the link information Link target (S46: Yes), the control unit 230 advances the process to step S50 to cause the display unit 260 to display the relevant short text posting site. Specifically, the control unit 230 makes access to the linked short text posting site via the communication network 80 to acquire image information, and causes the display unit 260 to display the image information.

In a case where the URL of a short text posting site is not included in the link information Link target (S46: No) or after performing a display of the short text posting site in step S50, the control unit 230 determines in step S54 whether the acquired link information Link target includes the URL of a missed program providing site. In a case where the URL of a missed program providing site is included in the link information Link target (S5: Yes), the control unit 230 advances the process to step S58 to cause the display unit 260 to display the missed program providing site. Specifically, the control unit 230 makes access to the linked missed program providing site via the communication network 80 to acquire image information, and causes the display unit 260 to display the image information.

In a case where the URL of a missed program providing site is not included in the link information Link target (S54: No) or after performing a display of the missed program providing site in step S58, the process returns to step S22, and the respective step S22 to step S58 having been described so far are repeated.

Note that the order of step S30, step S38, step S46, and step S54 may be changed as necessary. In addition, without directly displaying a web site, a short text posting site, and a missed program providing site in step S34, step S50, and step S58, a screen for a user to select whether to browse the relevant sites may be displayed. In addition, in a case where there are a plurality of web sites, short text posting sites, and missed program providing sites that can be displayed respectively in step S34, step S50, and step S58, a screen for a user to select which site to be displayed may be displayed, without directly displaying each site.

(3-2. Control Process in Identification Code Server)

Figure 7:
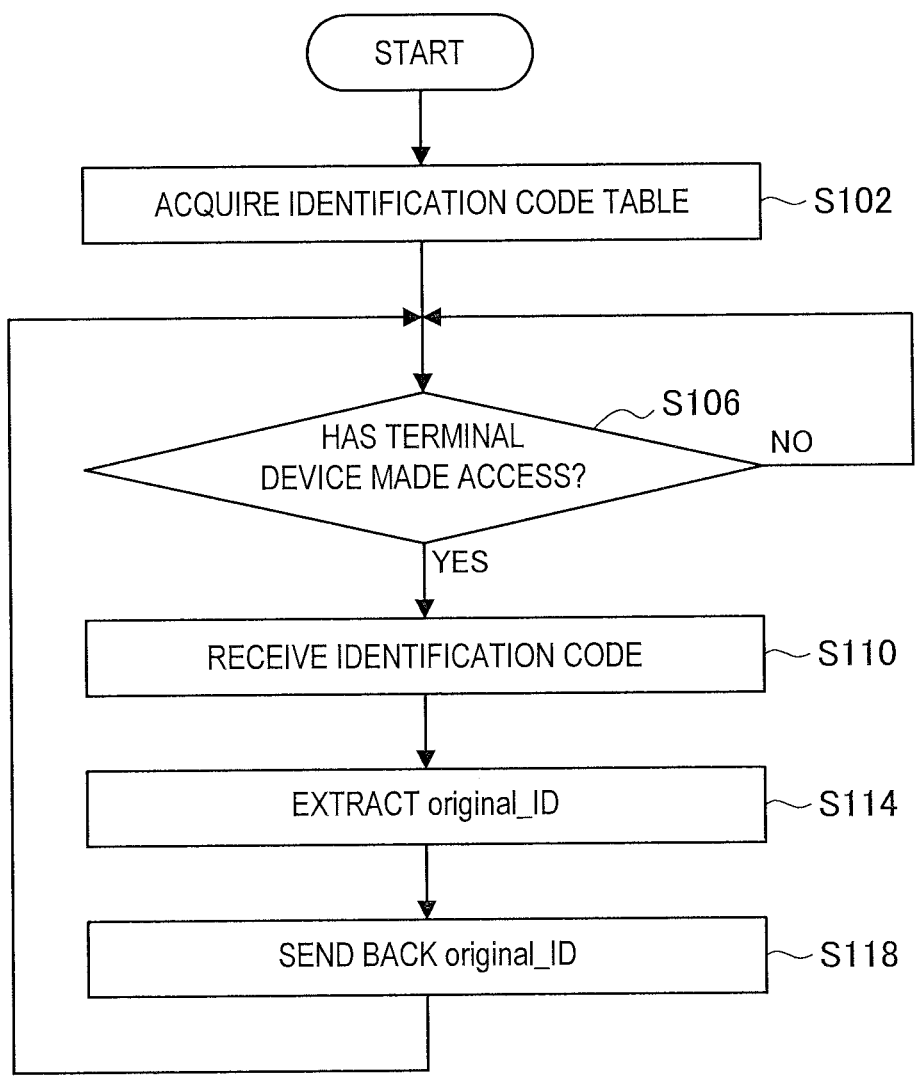
FIG. 7 is a flowchart showing an example of a control process in an identification code server.

FIG. 7 shows a flowchart of the control process executed by the CPU 330 of the identification code server 300. First, in step S102, the CPU 330 causes the storage device 310 to store the identification code table table_B. The identification code table table_B is managed by an administrator who manages an information processing system in which the link schedule server 100 is utilized, for example, and is stored in the storage device 310.

Then, in step S106, the CPU 330 determines whether the terminal device 200 has made access. In a case where the terminal device 200 has not made access (S106: No), the determination in step S106 is performed repeatedly. On the other hand, in a case where the terminal device 200 has made access (S106: Yes), the process proceeds into step S110, and the CPU 330 receives information indicating the identification code ID_code, such as a matrix type two-dimensional code.

Then, in step S114, the CPU 330 refers to the identification code table table_B to extract the individual identification information original_ID "XYZ" corresponding to the information indicating the identification code ID_code of the television program "AAA." Then, in step S118, the CPU 330 sends back the extracted individual identification information original_ID "XYZ" to the terminal device 200 via the communication network 80.

Thereafter, the process returns to step S106, and each time when the terminal device 200 makes access, individual identification information original_ID corresponding to information indicating the identification code ID_code is extracted, and sent back to the terminal device 200. Accordingly, the individual identification information original_ID necessary for the registration processing in the terminal device 200 is transmitted to the terminal device 200.

(3-3. Control Process in Link Schedule Server)

Figure 8:
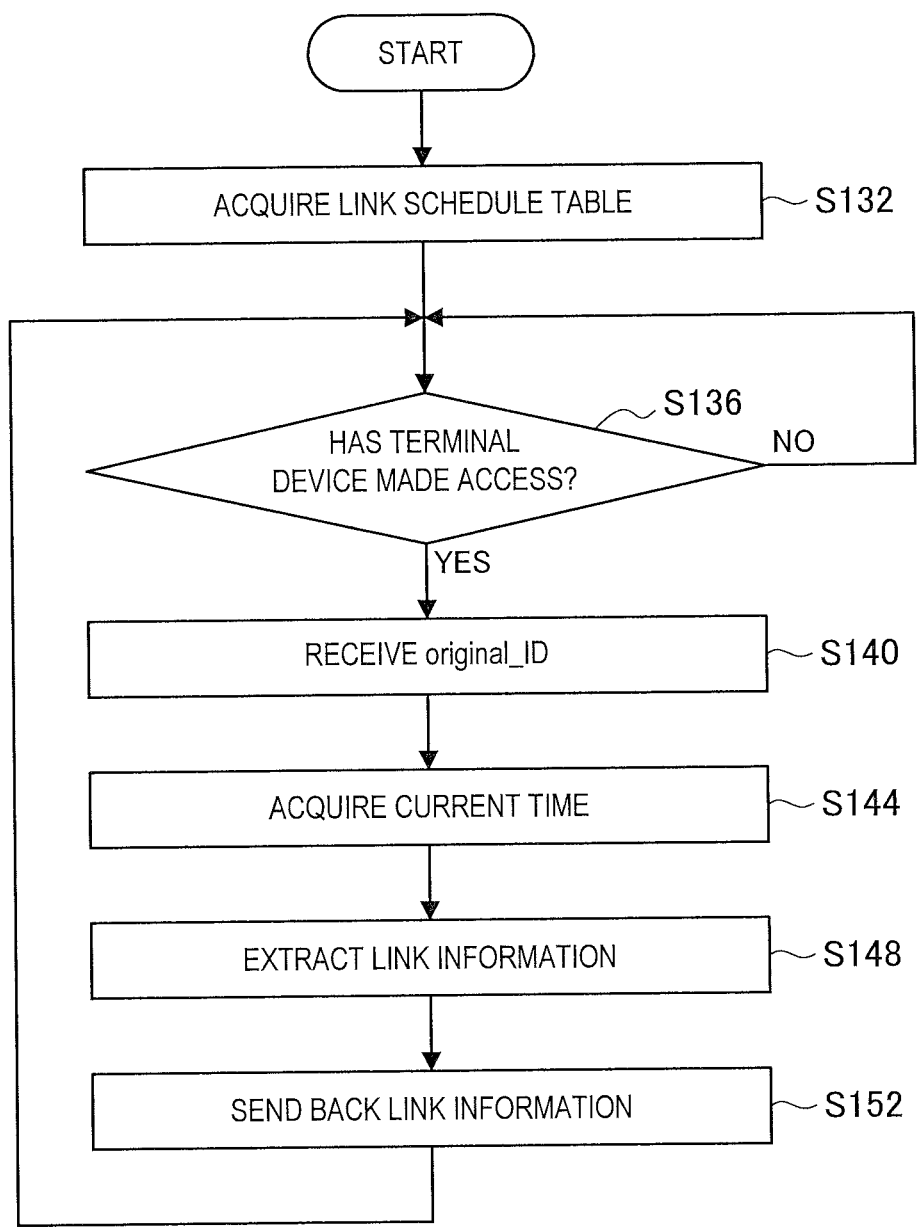
FIG. 8 is a flowchart showing an example of a control process in the information processing device (link schedule server) according to the embodiment.

FIG. 8 shows a flowchart of the control process executed by the link schedule server (information processing device) 100. First, in step S132, the extraction unit 110 of the CPU 105 causes the storage device 130 to store the link schedule table table_A. The link schedule table table_A is managed by a broadcast station that will broadcast the television program "AAA", for example, and is created, updated, deleted, and the like.

Then, in step S136, the CPU 130 determines whether the terminal device 200 has made access. In a case where the terminal device 200 has not made access (S136: No), the determination in step S136 is performed repeatedly. On the other hand, in a case where the terminal device 200 has made access (S136: Yes), the process proceeds into step S140, and the extraction unit 110 receives the individual identification information original_ID "XYZ."

Then, in step S144, the extraction unit 110 acquires information regarding the current time. Then, in step S148, the extraction unit 110 refers to the link schedule table table_A corresponding to the individual identification information original_ID "XYZ" to extract link information Link Target in accordance with the current time. The link information Link Target to be extracted is not limited to one piece, but a plurality of pieces of link information Link Target may be extracted.

Then, in step S152, the transmission control unit 120 sends back the extracted link information Link Target to the terminal device 200 via the communication network 80. Thereafter, the process returns to step S136, and each time when the terminal device 200 makes access, link information Link Target related to the individual identification information original_ID is extracted in accordance with the current time, and sent back to the terminal device 200.

Accordingly, link Target regarding various contents is transmitted to the terminal device 200 in accordance with the current time, and in the terminal device 200, an operation in accordance with the link information Link Target is performed. Consequently, a user of the terminal device 200 can be guided to various contents to gain various experiences merely by registering the individual identification information original_ID regarding a television program in which the user is interested.

4. VARIATIONS OF CONTROL PROCESS

Next, variations of the control process in the terminal device 200 in the information processing system according to the present embodiment will be described. In the following description, points changed from the above-described flowchart shown in FIG. 6 will mainly be described.

(4-1. First Variation)

A first variation is different from the above-described control process in that, in a case where link information Link Target acquired by the terminal device 200 is the same as link information Link Target acquired at a previous time, the control unit 230 repeats a request for link information Link Target without performing an operation control based on the link information Link Target.

FIG. 9 is a flowchart showing the first variation of the control process in the terminal device 200. In the flowchart of the first variation, step S72 to step S80 are added between step S26 and step S30 in the flowchart shown in FIG. 6.

In such a first variation, in a procedure similar to step S10 to step S26 in the flowchart shown in FIG. 6, acquisition of information indicating the identification code ID_code, access to the identification code server 300, acquisition of the individual identification information original_ID "XYZ", polling to the link schedule server 100, and acquisition of link information Link Target are performed.

Then, in step S72, the control unit 230 determines whether the acquired link information Link Target has been changed from the link information Link Target acquired at a previous time. In a case where the link information Link Target acquired this time is the same as the link information Link Target acquired at the previous time (S72: No), the process returns to step S22 without an operation control in accordance with the link information Link Target being performed.

On the other hand, in a case where the link information Link Target acquired this time has been changed from the link information Link Target acquired at the previous time (S72: Yes), the process proceeds into step S76, and the control unit 230 causes the display unit 260 to present a popup display that notifies that the link information Link Target has been changed. In the first variation, such a popup display includes a display that causes a user to select whether to utilize a linked content.

Then, in step S80, the control unit 230 determines whether the user has made a selection of utilizing the linked content. In a case where the user has not made a selection of utilizing the content (S80: No), the process returns to step S22 without an operation control in accordance with the link information Link Target being performed. On the other hand, in a case where the user has made a selection of utilizing the linked content (S80: Yes), the process proceeds into step S30, and the control unit 230 executes displaying of a web site, recording reservation, and the like in accordance with the acquired link information Link Target in a procedure similar to step S30 to step S58 in the flowchart shown in FIG. 6.

According to the first variation, repeated execution of an operation of displaying a web site that a user has already browsed and a recording reservation operation for a television program having been subjected to recording reservation is avoided. Consequently, content utilization by a user becomes comfortable.

(4-2. Second Variation)

In the embodiment and the first variation described above, a request for link information Link Target is made from the terminal device 200 side to the link schedule server 100 side, and the link information Link Target is acquired. A second variation is different from the above-described control process in that, in a case where a notification that notifies update, such as a change or addition, of link information Link Target is transmitted from the link schedule server 100 side to the terminal device 200 side, the terminal device 200 acquires the link information Link Target from the link schedule server 100.

FIG. 10 is a flowchart showing the second variation of the control process in the terminal device 200. In the flowchart of the second variation, step S22 and step S26 in the flowchart shown in FIG. 6 have been replaced by step S90 to step S98.

In such a second variation, in a procedure similar to step S10 to step S18 in the flowchart shown in FIG. 6, acquisition of information indicating the identification code ID_code, access to the identification code server 300, and acquisition of the individual identification information original_ID "XYZ" are performed. Then, in step S90, the control unit 230 transmits the individual identification information original_ID "XYZ" to the link schedule server 100 via the communication network 80. Accordingly, in the link schedule server 100, the terminal device 200 is registered as a distribution destination of link information Link Target regarding the individual identification information original_ID "XYZ."

Then, in step S94, the control unit 230 determines whether there is a notification from the link schedule server 100. In a case where there is no notification from the link schedule server 100 (S94: No), the control unit 230 repeats the determination in step S94. Then, in a case where there is a notification from the link schedule server 100 (S94: Yes), the control unit 230 makes access to the link schedule server 100 to acquire link information Link Target regarding a content related to the individual identification information original_ID "XYZ" in accordance with the current time.

Then, the process proceeds into step S30, and the control unit 230 executes displaying of a web site, recording reservation, and the like in accordance with the acquired link information Link Target in a procedure similar to step S30 to step S58 in the flowchart shown in FIG. 6.

According to the second variation, in a case where update of the link information Link Target is notified from the link schedule server 100 to the terminal device 200, the terminal device 200 acquires the link information Link Target. Accordingly, burdens on the terminal device 200 side are reduced, and repeated execution of an operation of displaying a web site that a user has already browsed and a recording reservation operation for a television program having been subjected to recording reservation is avoided. Consequently, content utilization by a user becomes comfortable.

5. CONCLUSION

As described above, the link schedule server (information processing device) 100 according to the present embodiment stores the link schedule table table_A in which link information Link Target regarding a plurality of contents has been associated with the individual identification information original_ID "XYZ" regarding the television program "AAA" together with a time axis. The link schedule server 100 extracts link information Link Target in accordance with the current time from the link schedule table table_A, and transmits the link information Link Target to the terminal device 200 in which the individual identification information original_ID "XYZ" has been registered in advance. Consequently, a user of the terminal device 200 can utilize various contents related to the television program "AAA" before broadcasting, during broadcasting, and after broadcasting of the television program "AAA", and can obtain a high degree of satisfaction.

In addition, the link schedule server 100 according to the present embodiment facilitates establishing business in which services provided by a plurality of administrators are coordinated for contents whose administrators are different, such as a program introduction site, event identification information event_ID, and a missed program providing site.

Moreover, the link schedule table table_A stored in the link schedule server 100 can be updated sequentially. Accordingly, link information Link Target regarding a content to be provided for a user can be changed dynamically. Consequently, the user can access various contents related to the television program "AAA" in a timely fashion to gain abundant experiences. In addition, if the link schedule table table_A can be updated sequentially, a new link destination can be added with the lapse of time, and even after a past web site is closed, the user can be guided to a related site, such as a different program introduction site or a site on which related goods are sold, to lead to related business as well.

Furthermore, if the link schedule table table_A can be updated sequentially, a user can easily compare costs to select a more inexpensive site or utilize a site for which utilization has been registered, by sequentially adding a missed program providing site that provides the television program "AAA", for example.

In addition, in the first variation, repeated execution of an operation of displaying a web site that a user has already browsed and a recording reservation operation for a television program having been subjected to recording reservation is avoided. Consequently, content utilization by a user becomes comfortable.

Further, in the second variation, in a case where update of the link information Link Target is notified from the link schedule server 100 to the terminal device 200, the terminal device 200 acquires the link information Link Target. Accordingly, burdens on the terminal device 200 side are reduced, and repeated execution of an operation of displaying a web site that a user has already browsed and a recording reservation operation for a television program having been subjected to recording reservation is avoided. Consequently, content utilization by a user becomes comfortable.

6. APPLICATION EXAMPLES

In the above embodiment, description has been made using a television program as an event by way of example, whilst even for an event other than a television program, it is possible to increase the degree of satisfaction of a user utilizing the information processing device according to the present embodiment.

For example, in a case where the event is a concert, a theatrical performance, or the like, an introduction site for the event may be launched prior to the date when the event is held to provide users having interest in the event with the URL of the introduction site, and a map of a venue of the event may be set as a link destination on the date when the event is held. In addition, in the time slot in which the event is held, a short text posting site may be launched to provide the URL of the relevant site, and after the event is finished, the URL of an online shopping site may be provided in agreement with release of a DVD on which the event has been recorded, for example.

Alternatively, in a case where the event is a job interview or the like, an introduction site for information for applicants or the like may be launched prior to the date when the interview is held to provide users having interest in recruiting companies with the URL of the introduction site, and the map of an interview venue may be set as a link destination on the date when the interview is held. In addition, a social networking service site may be launched as a place for users having interest in the recruiting companies to communicate with one another to provide the URL of the relevant site.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above-described embodiment, the terminal device 200 analyzes the identification code ID_code, such as the matrix type two-dimensional code, and converts the identification code ID_code into information indicating the identification code ID_code, whilst the technology of the present disclosure is not limited to such an example. Processing of conversion into information indicating the identification code ID_code may be performed by the identification code server 300.

Moreover, in the first variation of the above-described embodiment, the operation process based on link information Link Target is omitted in a case where there is no change in the link information Link Target acquired by the terminal device 200, whilst the technology of the present disclosure is not limited to such an example. For example, in a case where link information Link Target extracted in accordance with the current time on the link schedule server 100 side that transmits link information Link Target is the same as link information Link Target having already been transmitted to the terminal device 200, transmission of the link information Link Target may be omitted. Alternatively, the link information Link Target that the link schedule server 100 has transmitted once to the terminal device 200 may be prevented from being extracted thereafter.

Furthermore, in the above-described embodiment, the identification code ID_code is converted into the individual identification information original_ID, and link information Link Target is provided using the relevant individual identification information original_ID, whilst the technology of the present disclosure is not limited to such an example. For example, the link schedule server 100 may extract corresponding link information Link Target using information indicating the identification code ID_code for transmission to the terminal device 200.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

an extraction unit configured to extract, from a link schedule table in which link information regarding a plurality of contents has been associated with individual identification information that identifies a predetermined event together with a time axis, the link information regarding a content in accordance with a current time; and a transmission control unit configured to transmit the link information regarding the content having been extracted to a terminal device in which the individual identification information has been registered.

(2)

The information processing device according to (1), in which the link schedule table includes information regarding at least one of a start time and an end time of validating the link information regarding the content.

(3)

The information processing device according to (1) or (2), in which the plurality of contents include a web site that introduces detailed information regarding the event, and the link information regarding the content includes address information regarding the web site.

(4)

The information processing device according to any one of (1) to (3), in which the plurality of contents include a short text posting site, and the link information regarding the content includes address information regarding the short text posting site.

(5)

The information processing device according to (4), in which the address information regarding the short text posting site is validated at least during progress of the event.

(6)

The information processing device according to any one of (1) to (5), in which the plurality of contents include television broadcasting, and the link information regarding the content includes event identification information allocated to a television program.

(7)

The information processing device according to (6), in which the event identification information is validated in a period up to a broadcasting end time of the television program.

(8)

The information processing device according to any one of (1) to (7), in which the plurality of contents include a missed program providing site, and the link information regarding the content includes address information regarding the missed program providing site.

(9)

The information processing device according to (8), in which the address information regarding the missed program providing site is validated after television broadcasting as the event or television broadcasting related to the event is finished.

(10)

The information processing device according to (1) or (2), in which the predetermined event is a television program, and the link schedule table includes at least one of address information regarding an introduction site for the television program, event identification information allocated to the television program, address information regarding a viewing reminder site, address information regarding a short text posting site, and address information regarding a missed program providing site in such a manner that validation start times arrive in this order.

(11)

The information processing device according to any one of (1) to (10), in which the link schedule table is able to be changed at any time.

(12)

The information processing device according to any one of (1) to (11), in which the transmission control unit omits transmission of the link information in a case where the link information regarding the content having been extracted is same as link information having already been transmitted to the terminal device.

(13)

An information processing method including:

extracting, from a link schedule table in which link information regarding a plurality of contents has been associated with individual identification information that identifies a predetermined event together with a time axis, the link information regarding a content in accordance with a current time; and transmitting the link information regarding the content having been extracted to a terminal device in which the individual identification information has been registered.

(14)

A control device including:

a registration processing unit configured to perform processing of registering individual identification information that identifies a predetermined event;

an acquisition unit configured to acquire link information regarding a content extracted in accordance with a current time from a link schedule table in which link information regarding a plurality of contents has been associated with the individual identification information together with a time axis and transmitted by an information processing device; and a control unit configured to perform predetermined operation control on a basis of the link information having been acquired.

(15)

The control device according to (14), in which the registration processing unit transmits information indicating an identification code to an identification code server, and receives the individual identification information corresponding to the information indicating the identification code from the identification code server.

(16)

The control device according to (14) or (15), in which the control unit causes a display unit to display the content on the basis of the link information.

(17)

The control device according to any one of (14) to (16), in which the control unit performs a display that prompts a user for an operation in accordance with the content on the basis of the link information.

REFERENCE SIGNS LIST

50 television receiver
54 recording apparatus
100 link schedule server (information processing device)
110 extraction unit
120 transmission control unit
130 storage device
200 terminal device
300 identification code server

The invention claimed is:

1. An information processing device comprising:
   an extraction unit configured to extract link information from a link schedule table in accordance with a current time, wherein the link schedule table includes a plurality of links, wherein each link of the plurality of links is associated with respective individual identification information that identifies a corresponding predetermined event together with a time axis, wherein multiple links of the plurality of links are associated with a common corresponding predetermined event and with different times of the time axis, and wherein the extracted link information includes at least one of the plurality of links, wherein the extraction unit is configured to extract only the link information for which the associated time axis corresponds to the current time, whereby for at least one given time along the time axis, link information from only some of the plurality of links associated with the common corresponding predetermined event is extracted from the link schedule table; and
   a transmission control unit configured to transmit the extracted link information to a terminal device in which the individual identification information associated with the link included in the extracted link information has been registered.

2. The information processing device according to claim 1, wherein one or more of the plurality of links is associated with at least one of a start time and an end time of the corresponding event used to validate the link information.

3. The information processing device according to claim 1, wherein one or more of the plurality of links includes a web site that introduces detailed information regarding the corresponding event, and the link information includes address information regarding the web site.

4. The information processing device according to claim 1, wherein one or more of the plurality of links includes a short text posting site, and the link information includes address information regarding the short text posting site.

5. The information processing device according to claim 4, wherein the address information regarding the short text posting site is validated at least during progress of the event.

6. The information processing device according to claim 1, wherein the individual identification information includes television broadcasting, and the link information includes event identification information allocated to a television program.

7. The information processing device according to claim 6, wherein the event identification information is validated in a period up to a broadcasting end time of the television program.

8. The information processing device according to claim 1, wherein the individual identification information includes a missed program providing site, and the link information includes address information regarding the missed program providing site.

9. The information processing device according to claim 8, wherein the address information regarding the missed program providing site is validated after television broadcasting as the event or television broadcasting related to the event is finished.

10. The information processing device according to claim 1, wherein the predetermined event is a television program, and the link schedule table includes at least one of address information regarding an introduction site for the television program, event identification information allocated to the television program, address information regarding a viewing reminder site, address information regarding a short text posting site, and address information regarding a missed program providing site in such a manner that validation start times arrive in this order.

11. The information processing device according to claim 1, wherein the link schedule table is able to be changed at any time.

12. The information processing device according to claim 1, wherein the transmission control unit is configured to omit transmission of the extracted link information in a case where the extracted link information is the same as link information that was already transmitted to the terminal device.

13. The information processing device according to claim 1, further comprising a communication unit configured to receive a request corresponding to the individual identification information from the terminal device, whereby the transmission control unit is configured to transmit the extracted link information in response to the request from the terminal device.

14. An information processing method comprising:
   extracting link information from a link schedule table in accordance with a current time, wherein the link information includes a plurality of links, wherein each link of the plurality of links is associated with respective individual identification information that identifies a corresponding predetermined event together with a time axis, and wherein the extracted link information includes at least one of the plurality of links, and wherein only the link information for which the associated time axis corresponds to the current time is extracted, whereby for at least one given time along the time axis, link information from only some of the plurality of links associated with a common corresponding predetermined event is extracted from the link schedule table; and
   transmitting the extracted link information to a terminal device in which the individual identification information associated with the link included in the extracted link information has been registered.

15. A control device comprising:
   a registration processing unit configured to perform processing of registering individual identification information that identifies a predetermined event;
   an acquisition unit configured to acquire link information that is extracted from a link schedule table in accordance with a current time, wherein the schedule table includes a plurality of links, wherein each link of the plurality of links is associated with respective individual identification information with a time axis and that is transmitted by an information processing device, and wherein only the link information for which the associated time axis corresponds to the current time is extracted, whereby for at least one given time along the time axis, link information from only some of the plurality of links associated with a common corresponding predetermined event is acquired by the acquisition unit; and
   a control unit configured to perform predetermined operation control on a basis of the acquired link information.

16. The control device according to claim 15, wherein the registration processing unit transmits information indicating an identification code to an identification code server, and receives the individual identification information corresponding to the information indicating the identification code from the identification code server.

17. The control device according to claim 15, wherein the control unit causes a display unit to display content on the basis of the link information.

18. The control device according to claim 15, wherein the control unit performs a display that prompts a user for an operation in accordance with the acquired link information on the basis of the link information.

* * * * *